(12) United States Patent  
Lee

(10) Patent No.: US 11,022,803 B2  
(45) Date of Patent: Jun. 1, 2021

(54) EYE GLASSES-TYPE TRANSPARENT DISPLAY USING MIRROR

(71) Applicant: Moon Key Lee, Seoul (KR)

(72) Inventor: Moon Key Lee, Seoul (KR)

(*) Notice: Subject to any disclaimer, the term of this patent is extended or adjusted under 35 U.S.C. 154(b) by 0 days.

(21) Appl. No.: 16/617,822

(22) PCT Filed: May 5, 2018

(86) PCT No.: PCT/KR2018/005238  
§ 371 (c)(1),  
(2) Date: Nov. 27, 2019

(87) PCT Pub. No.: WO2018/221867  
PCT Pub. Date: Dec. 6, 2018

(65) Prior Publication Data  
US 2020/0089002 A1    Mar. 19, 2020

(30) Foreign Application Priority Data

May 27, 2017 (KR) .......... 10-2017-0065748  
Apr. 30, 2018 (KR) .......... 10-2018-0050301

(51) Int. Cl.  
*G02B 5/30* (2006.01)  
*G02B 27/28* (2006.01)  
(Continued)

(52) U.S. Cl.  
CPC .......... *G02B 27/0172* (2013.01); *G02B 5/10* (2013.01); *G02B 27/0955* (2013.01);  
(Continued)

(58) Field of Classification Search  
CPC .......... G02B 5/10; G02B 5/30; G02B 5/3025; G02B 5/3083; G02B 6/0031;  
(Continued)

(56) References Cited

U.S. PATENT DOCUMENTS 5,572,343 A * 11/1996 Okamura .......... G02B 27/017  
345/8  
6,999,649 B1   2/2006 Chen et al.  
(Continued)

FOREIGN PATENT DOCUMENTS

JP   2004-294817 A   10/2004  
JP   2013-44836 A    3/2013  
(Continued)

OTHER PUBLICATIONS

DeepOptics website information. "Glasses Should Adapt." DeepOptics® 2017 (http://www.deepoptics.com/do_site/).  
(Continued)

*Primary Examiner* — Michael J Eurice  
(74) *Attorney, Agent, or Firm* — Leydig Voit & Mayer, Ltd.

(57) ABSTRACT

Provided is a glasses-type display with a small volume and a wide field of view, which can adjust the distance between the eyes and the image formed by light reflected from a concave mirror with an anisotropic convex lens having a converging refractive index corresponding to the rotation of a polarization axis.

11 Claims, 9 Drawing Sheets

(51) Int. Cl.
| | |
|---|---|
| *G02F 1/01* | (2006.01) |
| *G02F 1/1335* | (2006.01) |
| *G02B 27/01* | (2006.01) |
| *G02B 5/10* | (2006.01) |
| *G02B 27/09* | (2006.01) |
| *G02B 27/14* | (2006.01) |

(52) U.S. Cl.
CPC .......... *G02B 27/142* (2013.01); *G02B 27/28* (2013.01); *G02B 2027/0178* (2013.01)

(58) Field of Classification Search
CPC ............... G02B 27/142; G02B 27/017; G02B 27/0172; G02B 27/28; G02B 27/283; G02B 27/286; G02B 27/0068; G02B 27/0955; G02B 30/24; G02B 30/25; G02B 2027/0112; G02B 2027/0114; G02B 2027/0132; G02B 2027/0134; G02B 2027/0178; G02F 1/01; G02F 1/133528; G02F 1/133553; G02F 1/13471; G02F 1/0136; G02F 1/137; G02F 2001/13355; H04N 13/322; H04N 13/344; H04N 13/346; H04N 2213/001

See application file for complete search history.

(56) References Cited

U.S. PATENT DOCUMENTS

| | | | | |
|---|---|---|---|---|
| 2004/0212776 | A1* | 10/2004 | Spitzer | G02B 27/0172 351/41 |
| 2005/0180687 | A1* | 8/2005 | Amitai | G02B 6/003 385/31 |
| 2006/0119795 | A1* | 6/2006 | Lippey | G03B 33/06 353/20 |
| 2007/0153234 | A1* | 7/2007 | Salters | H04N 13/395 353/8 |
| 2010/0053311 | A1* | 3/2010 | Luber | G02B 25/004 348/53 |
| 2010/0149073 | A1* | 6/2010 | Chaum | G02B 27/0172 345/8 |
| 2011/0075257 | A1* | 3/2011 | Hua | H04N 13/383 359/464 |
| 2012/0044568 | A1* | 2/2012 | Jeon | G02C 7/12 359/465 |
| 2012/0113092 | A1* | 5/2012 | Bar-Zeev | G02B 27/0101 345/419 |
| 2013/0201543 | A1* | 8/2013 | Clarke | G02F 1/23 359/240 |
| 2013/0300634 | A1* | 11/2013 | White | G02B 27/017 345/7 |
| 2014/0293434 | A1* | 10/2014 | Cheng | G02B 30/26 359/630 |
| 2014/0340286 | A1* | 11/2014 | Machida | G02B 27/0172 345/8 |
| 2015/0178939 | A1* | 6/2015 | Bradski | G06F 3/017 345/633 |
| 2015/0370074 | A1* | 12/2015 | McDowall | G02B 5/3025 349/11 |
| 2016/0070104 | A1 | 3/2016 | Yang | |
| 2016/0282639 | A1* | 9/2016 | von und zu Liechtenstein | G02C 7/12 |
| 2016/0357146 | A1* | 12/2016 | Brooker | G02B 5/3083 |
| 2016/0377867 | A1* | 12/2016 | Kessler | G02B 5/3083 359/482 |
| 2017/0059869 | A1* | 3/2017 | Lee | G02B 27/0172 |
| 2017/0068100 | A1* | 3/2017 | Ouderkirk | G02C 7/081 |
| 2017/0269366 | A1* | 9/2017 | Lee | G02B 27/0172 |
| 2018/0210222 | A1* | 7/2018 | Seo | G02B 27/283 |
| 2018/0372940 | A1* | 12/2018 | Ishii | G02B 27/283 |
| 2019/0049732 | A1* | 2/2019 | Lee | G02B 5/30 |
| 2020/0096816 | A1* | 3/2020 | Lee | G02B 5/08 |
| 2020/0142213 | A1* | 5/2020 | Sato | G02B 5/3016 |
| 2020/0241305 | A1* | 7/2020 | Ouderkirk | G02B 27/0081 |

FOREIGN PATENT DOCUMENTS

| | | |
|---|---|---|
| KR | 10-2012-0006951 A | 1/2012 |
| KR | 10-1298874 B1 | 8/2013 |
| KR | 10-2015-0102552 A | 9/2015 |
| KR | 10-1672707 B1 | 10/2016 |
| KR | 10-2016-0134714 A | 11/2016 |
| WO | WO 2015/134740 A1 | 9/2015 |

OTHER PUBLICATIONS

Hong, Jy et al. "See-through optical combiner for augmented reality head-mounted display: index-matched anisotropic crystal lens." Scientific Reports 7, Article number: 2753. Published Jun. 5, 2017.

International Searching Authority, International Search Report in counterpart International Application No. PCT/KR2018/005238, dated Aug. 30, 2018.

International Searching Authority, Written Opinion in counterpart International Application No. PCT/KR2018/005238, dated Aug. 30, 2018.

KentOptronics product information. Liquid Crystal for Photonics. © Copyright 2014. KentOptronics, Inc. (http://kentoptronics.com/solutions.html).

Lee, S et al. "Additive Light Field Displays: Realization of Augmented Reality with Holographic Optical Elements." *Optical Engineering and Quantum Electronics Laboratory*. SIGGRAPH 2016. vol.35. Issue 4. Article No. 60 (http://oeqelab.snu.ac.kr/AdditiveLightFieldDisplays).

Lim, K-S et al. "Wide Bandwidth Reflective Microshutter Blind Panel for Transparent Organic Light-Emitting Diode Display." *Department of Electrical Engineering, KAIST*. pp. 129-130.

[OLEDNET] Toshiba One side emission transparent OLED lighting. OLED Research Media. Published on May 30, 2013 (https://www.youtube.com/watch?v=P7enttLmlqw).

Son, K-B et al. "Polarization-Dependent Microlens Array Using Reactive Mesogen Aligned by Top-Down Nanogrooves for Switchable Three-Dimensional Applications." *Journal of the Optical Society of Korea*. vol. 19, No. 3, Jun. 2015, pp. 265-271. DOI: http://dx.doi.org/10.3807/JOSK.2015.19.3.265.

Worrel, J. "Nvidia shows off its 'Light Field' VR headset at VRLA 2016." Published Jan. 25, 2016. (http://www.fudzilla.com/news/graphics/39762-nvidia-shows-off-its-light-fieldvr-headset-at-vrla-2016).

Japanese Patent Office, Office Action in counterpart Japanese Patent Application No. 2019-565245, dated Dec. 15, 2020.

* cited by examiner polarization direction

EYE GLASSES-TYPE TRANSPARENT DISPLAY USING MIRROR

TECHNICAL FIELD

The present invention relates to a transparent glasses-type display with a wide field of view.

BACKGROUND ART

The present invention relates to a transparent glasses-type display which can display virtual reality or augmented reality images.

DESCRIPTION OF EMBODIMENTS

Technical Problem

These days, glasses-type displays such as Oculus Rift have been developed.

Although they have a wide field of view, such glasses-type displays have the disadvantage of being bulky and non-transparent.

Microsoft, on the other hand, has launched a transparent glasses-type display called HoloLens, which however has the disadvantage of a narrow field of view.

A technique for solving this problem of a narrow field of view has been disclosed in U.S. patent application Ser. No. 14/749,568 (Head Mounted Augmented Reality Display).

As shown in FIG. 1, the invention of this US patent application relates to a display wherein light emitted from a semi-transparent display (DS) is reflected by a concave half-mirror (CM).

The semi-transparent display (DS) emits light only towards the concave half-mirror (the viewing direction) without emitting light towards the eyes.

Because the curvature of the concave half-mirror according to this technology is fixed, the distance between the image formed by reflecting light from the concave half mirror and the eyes is fixed.

As the distance between the image and eyes is fixed, a vergence-accommodation conflict is caused wherein the convergence angle of the two eyes and the eye focusing distance are inconsistent, thereby causing eye fatigue (this is referred as the first problem in the present invention).

The objective of the present invention is to solve the first problem by providing a glasses-type display capable of adjusting the distance between the image formed by reflection from the concave half-mirror in the above US patent invention and the eye.

Also, in order to prevent direct radiation of light to the eyes, the US patent discloses a circularly polarized light source is used as a display or the interval between pixels in an opaque display is widened and micro holes are formed between the pixels of the display through which the eyes can see the concave mirror.

However, it is difficult to obtain a circularly polarized light source and the resolution of the display decreases if micro holes are formed (which is referred to as the second problem in the present invention).

Another objective of the present invention is to solve the second problem by providing a technology to increase the resolution of the semi-transparent display of the US patent invention.

Solution to Problem

In order to solve the first problem, according to the present invention, a convex lens is added to the concave side (eye side) of the concave half-mirror and a concave lens is added to the convex side (viewing direction) of the concave half-mirror, wherein the overlapped convex and concave lenses operate like transparent glass, have the same absolute value of focal length but opposite sign values of focal length, and are anisotropic lenses with the different refractive indexes for different polarization light.

In addition, a polarization film and a polarization rotating unit are added between the semi-transparent display and the convex lens so that when light is emitted from the semi-transparent display towards the concave mirror, only specific polarization light among all light passes through the polarization film and the polarization axis of the passing light is rotated by a polarization unit.

Thus, because the convergence refractive index of the convex lens is different for a polarization axis of the passing light, the amount of the polarization rotation is controlled electrically, then the amount of convergence of the convex lens can be controlled and thus the distance between the image formed by the convex lens and the concave mirror and the eyes can be adjusted.

Also, in order to solve the second problem, the present invention provides a semi-transparent display including a light blocking unit such as a dichroic color filter, liquid crystal shutter, or MEMS shutter which is located at the eye side surface of the semi-transparent display and reflects, towards the concave mirror, the light emitted from the eye side surface of the semi-transparent display to the eyes.

The dichroic filter is a filter which can reflect light of a specific color and transmit light of colors except the specific color.

Advantageous Effects of Disclosure

Because the transparent display using the mirror of the present invention is transparent, an augmented reality image can be displayed overlapping a surrounding landscape.

Also, by adding the liquid crystal shutter outside the concave half-mirror, when the shutter is closed, the device can be used as a conventional glasses-type display for virtual reality because the outside cannot be seen.

Also, by adding the convex lens to the concave side of the concave mirror, the distance between the transparent display and the concave mirror, the curvature of the concave mirror, and the volume of the device can be reduced.

MODE OF DISCLOSURE

Embodiment 1

The objective of the present invention is to solve the problem of U.S. patent application Ser. No. 14/749,568

(Head Mounted Augmented Reality Display) wherein the curvature of the concave mirror is fixed and a conflict occurs between the converging angle of viewing directions of two eyes and the focal length of eyes (this is referred to as a vergence-accommodation conflict), which results in eye fatigue (the first problem in the present invention).

Figure 1:
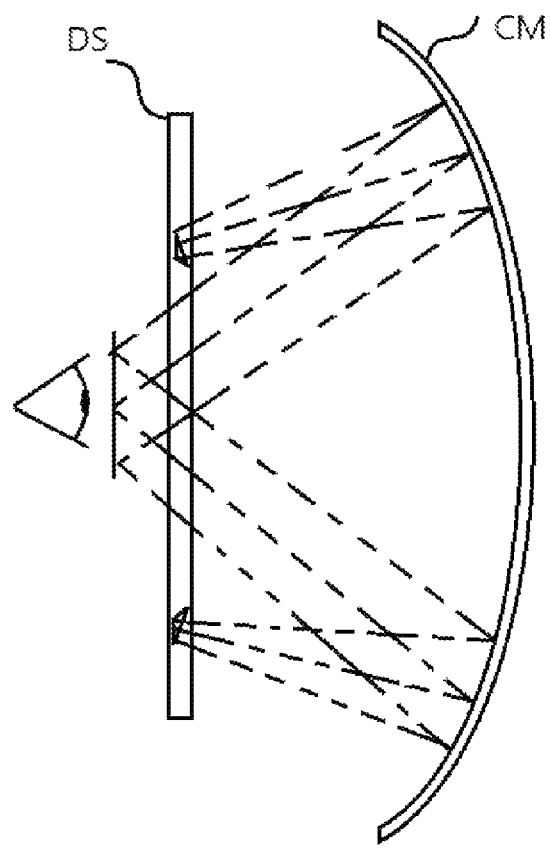
FIG. 1 shows a configuration of conventional technology.

As shown in FIG. 1, the invention of US patent relates to a display including a semi-transparent display (DS) and a concave half-mirror (CM), wherein light emitted from the semi-transparent display is reflected from the concave half-mirror and is sensed by the eye.

The semi-transparent display emits light towards the concave half-mirror without emitting light towards the eye.

Because the curvature of the concave mirror in the US patent invention is fixed, a conflict occurs between the converging angle of the viewing directions of two eyes and the focal length of the eye, which results in eye fatigue (this is referred to as a vergence-accommodation conflict).

A half-mirror is a mirror which can reflect part of light and transmit other part of light.

The objective of the present invention is to provide a glasses-type display which can adjust the distance between the eyes and the image formed by reflected light from the concave mirror in the US patent invention.

Figure 2:
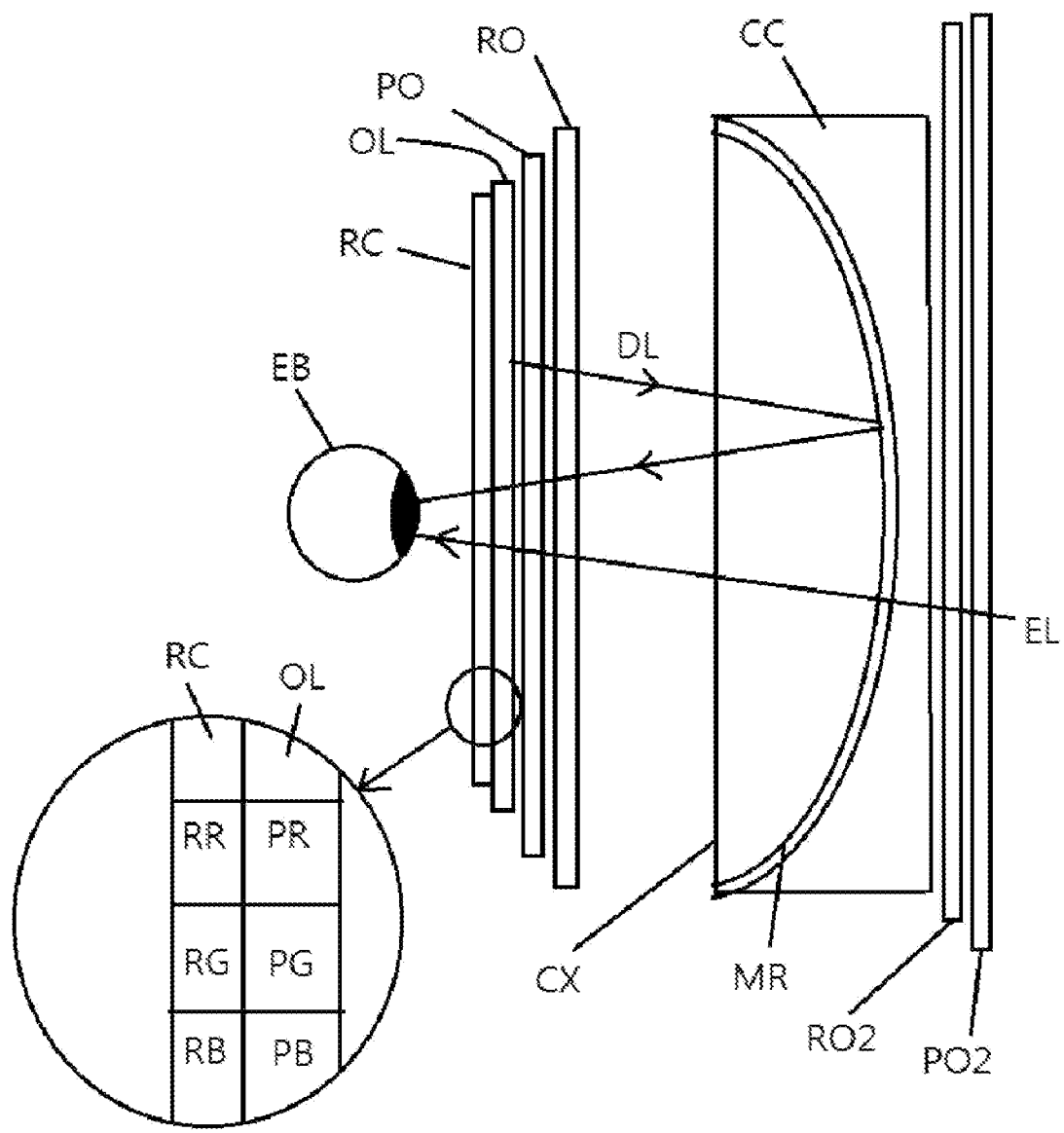
FIG. 2 shows a configuration of the present invention.

In order to solve this problem, as shown in FIG. 2, according to the present invention, a convex lens (CX) is added to the concave side (towards the eye) of the concave half-mirror (MR) or mirror and a concave lens (CC) is added to the convex side (in the viewing direction) of the mirror, wherein the overlapped convex and concave lenses operate like transparent glass, have the same absolute value of focal length but opposite sign of focal length, and are anisotropic lenses with different refractive indexes for different polarization light.

Alternatively, only the convex lens is an anisotropic lens and the convex lens is an ordinary lens.

Also, a flat mirror can be used instead of the concave mirror.

The anisotropic lens can be manufactured by machining a convex and concave lens as shown in FIG. 2 from a calcite plate, for example, a glass plate.

Such lenses can be Fresnel lenses in order to reduce weight.

Also, instead of calcite, liquid crystals aligned in a specific direction or an anisotropic material may be used to form a lens.

A technique about a glasses-type display using an anisotropic lens is published in the following paper.

Reference 1: See-through Optical Combiner for Augmented Reality Head-Mounted Display: Index-Matched Anisotropic Crystal Lens.

Figure 3:
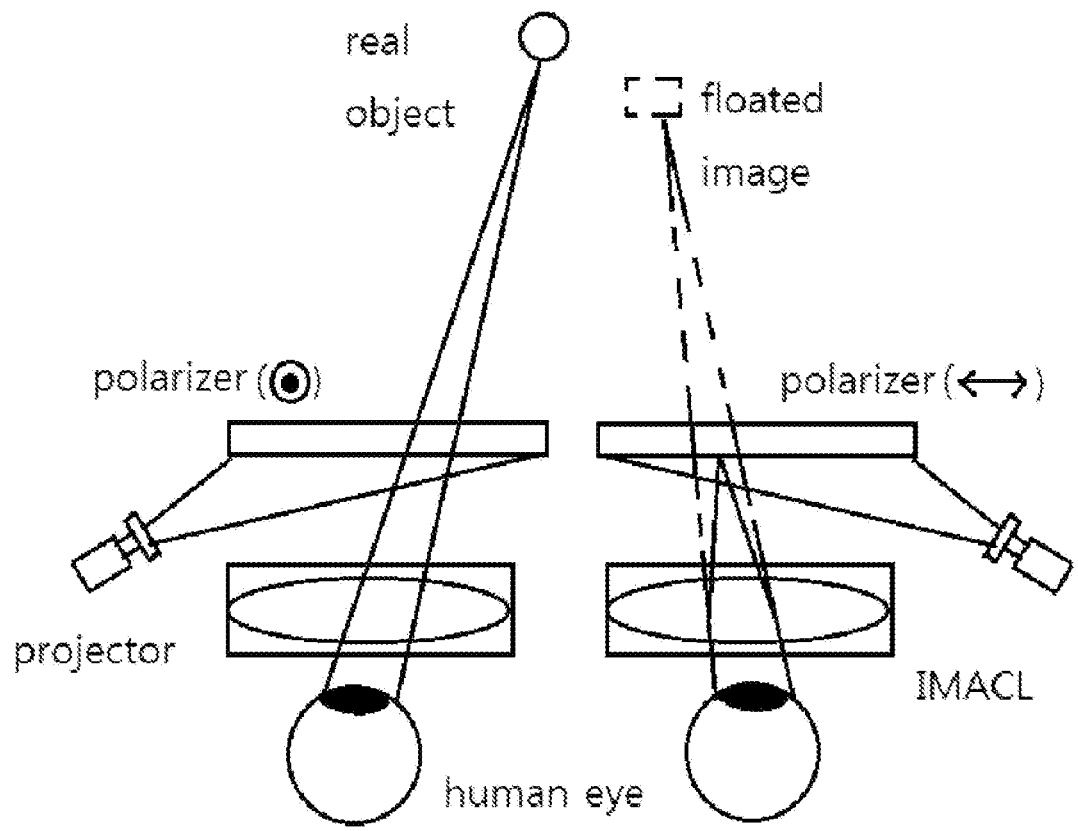
FIG. 3 shows a configuration of a conventional transparent glasses-type display.

FIG. 3 is an excerpt from reference 1 and shows an optical module (IMACL) including a calcite lens and an index matching material in front of the eye, wherein light of one kind of polarization converges while passing through the optical module, whereas light of another kind of polarization passes through the optical module without refraction like passing through a glass plate.

The two kinds of polarization may be vertical polarization and horizontal polarization.

These two kinds of polarization are referred to as first and second polarization in the present invention.

Calcite is a material which has different refractive indexes for the first and second polarization.

If a material and a lens have the same refractive index for a given polarization (for example, the second polarization), then the material is referred to as an index-matched material with the lens with respect to the second polarization, and if a flat plate glasses like optical module (IMACL) includes a calcite convex lens and an index-matched material as shown in FIG. 3, then first polarization light converges while passing through the IMACL whereas second polarization light passes through the IMACL without refraction like passing through a glass plate.

A technique of making an anisotropic lens with liquid crystals is published in the following paper.

Reference 2: Polarization-Dependent Microlens Array Using Reactive Mesogen Aligned by Top-Down Nanogrooves for Switchable Three-Dimensional Applications (Journal of the Optical Society of Korea Vol. 19, No. 3, June 2015, pp. 265-271, ISSN: 1226-4776(Print)/ISSN: 2093-6885(Online) DOI: ttp://dx.doi.org/10.3807/JOSK.2015.19.3.265).

Figure 4:
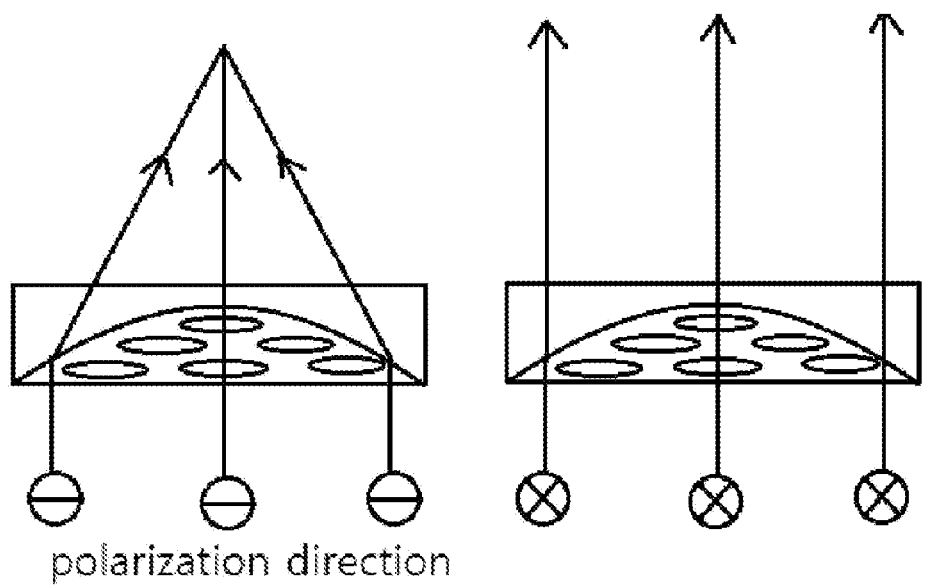
FIG. 4 shows the refractive property of an anisotropic lens for polarization.

FIG. 4 is an excerpt from reference 2. FIG. 4 shows a flat plate like optical module including a horizontally aligned liquid crystal convex lens and an index matching concave lens. FIG. 4 shows light passing through the optical module, wherein light of one polarization converges and light of another polarization passes though the optical module without refraction like passing through a glass plate.

According to FIG. 2, the first polarization film (PO) and the first rotating unit of the polarization axis are added between the semi-transparent display (OL) and the convex lens (CX), wherein only light of a specific polarization (for example, the first polarization) emitted from the semi-transparent display passes through the polarization film and the polarization axis of the passing light is rotated by the rotating unit of the polarization axis and passes through the convex lens.

Since the refractive index of the convex lens (CX) of the anisotropic material depends on the amount of rotation of the polarization axis of passing light, if the amount of the rotation of the polarization axis is electrically controlled, then the amount of convergence of the convex lens can be controlled and the distance between the eye and the image on semi-transparent display can be controlled, the image being formed by the light that passed through the convex lens and was reflected by the concave mirror.

The first unit (RO) of rotation of the polarization axis can be made by removing the color filter and the polarization film from the liquid crystal display or can be made by removing the polarization film from both sides of the lens of shutter glasses for a shutter glasses type 3D display.

The shutter glasses lens include a twisted nematic liquid crystal filled between two transparent plates and a polyimide is vertically formed on inner surfaces of the plates coated with a transparent electrode.

If no electric signal is applied to the transparent electrode, then the axis of polarization of the light passing through the shutter glasses lens is rotated by 90 degree by the twisted liquid crystal, and if an electric signal is applied, then there is no change in the axis of polarization of the passing light.

If the applied voltage is continuously changed, then the rotation angle of the axis of polarization can be controlled continuously.

If the applied voltage to such shutter glasses lens is controlled, then the amount of rotation of the axis of polarization can be controlled.

Like this, a lens of variable focal length can be made by the first polarization film, the first unit of the rotation of the polarization axis, and an anisotropic lens, and by installing the lens of variable focal length between the transparent display (OL) and concave half-mirror (MR), a displayed image outputted from the semi-transparent display can be seen as if it is located near or far with respect to the eye.

Also, if the concave lens (CC) includes the same material as the anisotropic convex lens or index matching material and the concave lens (CC) is installed outside the concave mirror as shown in FIG. 2, then a surrounding landscape can be seen like being seen through a transparent glasses window and an augmented reality image can be displayed by the device of the present invention.

In this case, at the outside of the concave lens, it is recommended to include the second polarization film (PO2) and the second unit (RO2) of rotation of the polarization axis as shown in FIG. 2, wherein the second polarization film (PO2) transmits only a specific polarization (first polarization or second polarization) towards the eye.

The reason is that light (EL) reflected by outside objects and entering the glasses-type display of the present invention contains a mixture of the first and second polarizations, and if light of the mixture of two polarizations passes through the anisotropic convex lens (CX) at the same time then the light of two polarizations is refracted differently, the outside object may be seen double.

The reason why the second unit (RO2) of rotation of the polarization axis is necessary is as follows.

If the second unit (RO2) of rotation of the polarization axis is not present, then the incoming light (EL) from the outside passes the first unit (RO) of rotation of the polarization axis, the polarization axis of the specific polarization of the passing light rotates and the rotation angle changes often according to the applied voltage to the first unit (RO) of rotation of the polarization axis.

Then, the amount of light passing through the first polarization film (PO) changes often and this causes the problem that brightness of the outside object is not constant. This problem can be solved by adding the second unit (RO2) of rotation of the polarization axis and applying a proper voltage to the second unit (RO2) of rotation of the polarization axis to rotate the polarization axis, so that the direction of rotation by the first unit of rotation of the polarization axis and the direction of rotation by the second unit of rotation of the polarization axis are in opposite directions.

In other words, it is recommended to apply a proper voltage to the second unit for rotation of the polarization axis so that the maximum incoming light (EL) from the outside can always pass through the first polarization film (PO).

Figure 6:
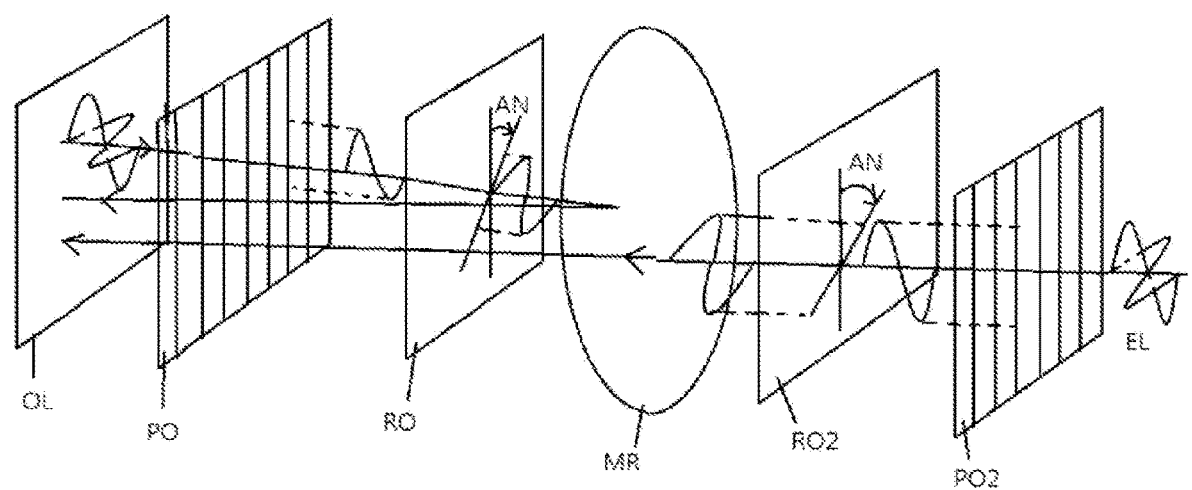
FIG. 6 is a detailed view of a polarization film and a unit of rotation of a polarization axis.

FIG. 6 shows this principle in detail.

According to FIG. 6, two polarization films (PO,PO2) both transmit only vertical polarization and the first unit (RO) of rotation of the polarization axis rotates the polarization axis of the vertically polarized light in a clockwise direction (AN), wherein the vertically polarized light is emitted from the transparent display (OL) and passes through the first polarization film (PO).

The incoming light (EL) from the outside passing through the second polarization film (PO2) becomes vertically polarized and the polarization axis of the vertically polarized light is rotated by the angle (AN) in the clockwise direction by the second unit (RO2) of rotation of the polarization axis, wherein the clockwise and counter clock direction are directions observed in the direction of propagation of light.

Then, this light becomes the vertically polarized light by passing through the first unit (RO) of rotation of the polarization axis and can reach the eye through the first polarization film (PO).

In other words, by using the device shown in FIG. 6, the first and second units of rotation of the polarization axis rotate the polarization axis of the vertically polarized light by the same angle but in opposite directions and the maximum incoming light (EL) from the outside can pass through the first polarization film and reach the eye, therefore an outside object can be seen very bright.

Because the first or second polarization light can pass through the concave lens, the concave mirror, and the convex lens like passing through a transparent glass plate without refraction and can reach the eye, a user can see the outside object and an image on the transparent display at the same time when wearing the device of the present invention.

Figure 7:
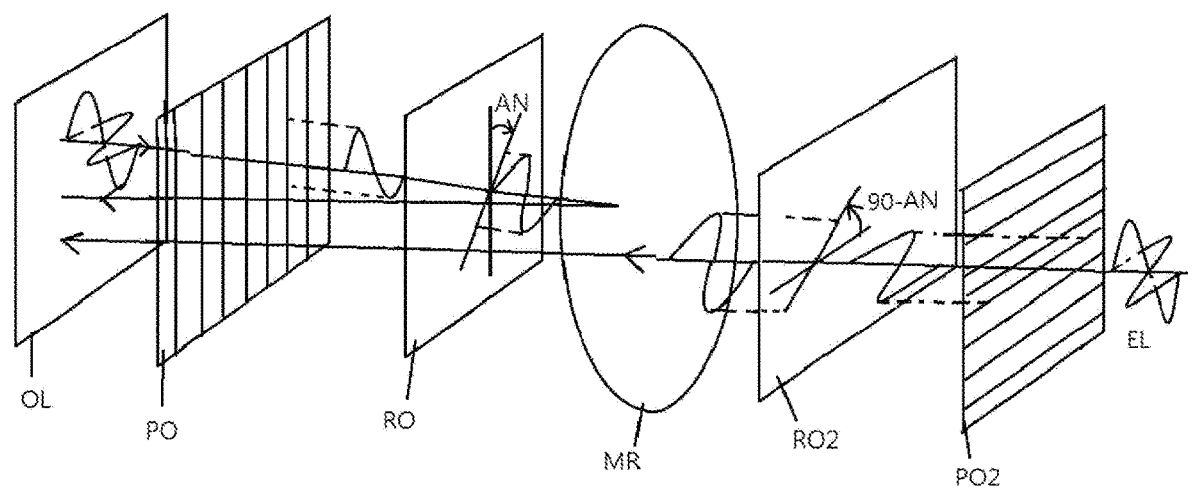
FIG. 7 is another detailed view of a polarization film and a unit of rotation of a polarization axis.

As shown in FIG. 7, if the second polarization film transmits only horizontally polarized light, then it is recommended that the second unit (RO2) of rotation of the polarization axis rotate the polarization axis by an angle 90-AN in the counter clockwise direction.

Also, even in the case when the anisotropic convex lens is thick, the unit (RO,RO1) of rotation of the polarization axis can be made thin and can be driven at high speed with low voltage.

By using such unit of rotation of the polarization axis, the polarization axis can be rotated and an image of a near object and an image of a far object can be displayed alternatively at high speed.

Embodiment 2

The objective of the present embodiment is to solve the low resolution problem of the display of U.S. patent application Ser. No. 14/749,568 (Head Mounted Augmented Reality Display).

The polarization film (PO,PO2) in embodiment 1 transmits a specific polarization and can include an absorption polarization film or a reflective polarization film.

The reflective polarization film transmits a specific polarization and reflects other polarization and can be made by aligning a micro wire grid.

If such reflective polarization film is used as the first polarization film (PO) of FIG. 2, then the semi-transparent display may be a transparent OLED and it is recommended to make the reflective dichroic coating on a side of the surface of display facing the eye in order to reflect color light from the pixel.

In this case, each pixel of the transparent OLED is configured to emit light of one color of the three primary colors.

Accordingly, if the dichroic reflective coating is formed on an eye side, the light emitted from the pixel of the transparent OLED is reflected towards the concave mirror and there is no glare. (In order to remove glare, the absorption color coating may be formed on the eye side of the transparent display to absorb color light emitted from the transparent display towards the eye.)

As shown in FIG. 2, the transparent display (OL) includes pixels and dichroic color reflective filters or color absorption filters, the pixels including light sources of three kinds.

For example, PR is a pixel including a red light source.
PG is a pixel including a green light source.
PB is a pixel including a blue light source.
Also, RR is a filter that reflects or absorbs red light
RG is a filter that reflects or absorbs green light.
RB is a filter that reflects or absorbs blue light.
In this case, RR is a filter that transmits light other than red light.
RG is a filter that transmits light other than green light.
RB is a filter that transmits light other than blue light.

In this case, if the polarization film (PO) of FIG. 2 is reflective, then the loss of light is reduced and the energy efficiency is increased. In other words, the electric power consumption is reduced and the battery usage time is increased.

Such reflective or absorption color filter blocks some light (EL in FIG. 2) from entering from the outside and darkening the view.

In order to brighten the view, it is recommended to install the liquid crystal shutter or MEMS (Micro-Electro-Mechanical-Systems) shutter to the eye side of each pixel of the transparent display and to block the light towards the eye by closing the shutter.

A technique for MEMS shutters is published in the following paper.

Reference 3: Wide Bandwidth Reflective Microshutter Blind Panel for Transparent Organic Light-Emitting Diode Display (the 18th Korean MEMS conference April 7-9).

In this case, if all the shutters are closed at the same time, then all the light (DL) emitted from the transparent display is blocked, the emitted light being reflected from the concave mirror towards the eye, and therefore it is recommended to divide the pixels of the display into 2 or multiple groups, to emit the light sequentially by each group, and to close only the shutters facing the pixels emitting light.

Figure 5:
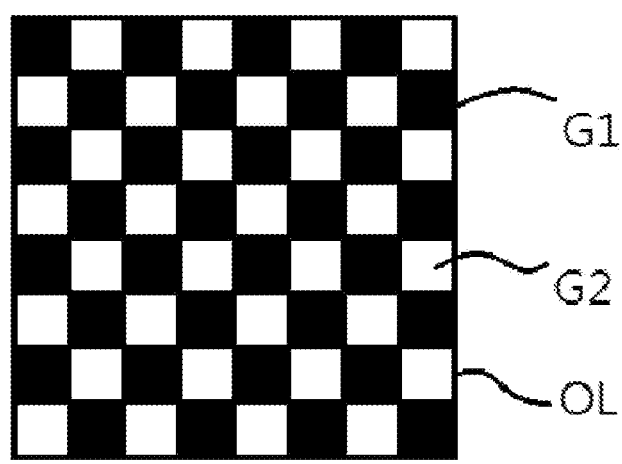
FIG. 5 is a plan view of an array of shutters.

For example, as show in FIG. 5, even pixels can be grouped into the first group (G1) and odd pixels can be grouped into the 2-nd group (G2).

In this case, an image is displayed as light is emitted by the pixels of the first group and at the same time the liquid crystal shutters or MEMS shutters of the first group (i.e., the shutters between the pixels of the first group and the eye) close and the liquid crystal shutters or MEMS shutters of the second group (i.e., the shutters between the pixels of the second group and the eye) open.

In the next moment, contrary to the above, an image is displayed as light is emitted from the pixels of the second group and at the same time the liquid crystal shutters or MEMS shutters of the second group close and the liquid crystal shutters or MEMS shutters of the first group open. This process is repeated at high speed.

FIG. 5 shows the shutters of the transparent display, wherein the shutters of the first group are closed and the shutters of the second group are open.

A liquid crystal shutter can be configured to have the same structure as the lens of shutter glasses for a shutter glasses 3D display.

In addition, the MEMS shutter refers to a shutter that blocks or transmits light via a micro plate controlled by an electric signal.

The liquid crystal shutter or the MEMS shutter can be configured for each pixel or for each group of neighboring pixels (for example, 2 rows and 2 columns of neighboring pixels).

For example, if the shutter is configured for each 2 rows×2 columns pixels, then the light passing the region of the 4 pixels of the 2 rows×2 columns can be blocked or transmitted at the same time.

Like this, if the color filter, liquid crystal shutter, or MEMS shutter are installed between the pixel and the eye, then the pixel to pixel spacing can be narrowed and the resolution of an image can be increased.

Embodiment 3

The present embodiment relates to applying the technique regarding lens of variable focal length of the embodiment 1 to a head-mounted display for virtual reality like Oculus CV1.

Current head-mounted displays for virtual reality have a vergence-accommodation conflict because the convex lens in front of the eye is fixed (the vergence-accommodation conflict means a conflict regarding the two eyes' vergence angle and the focal length of the eyes) and the objective of the present embodiment is to solve this problem.

Figure 8:
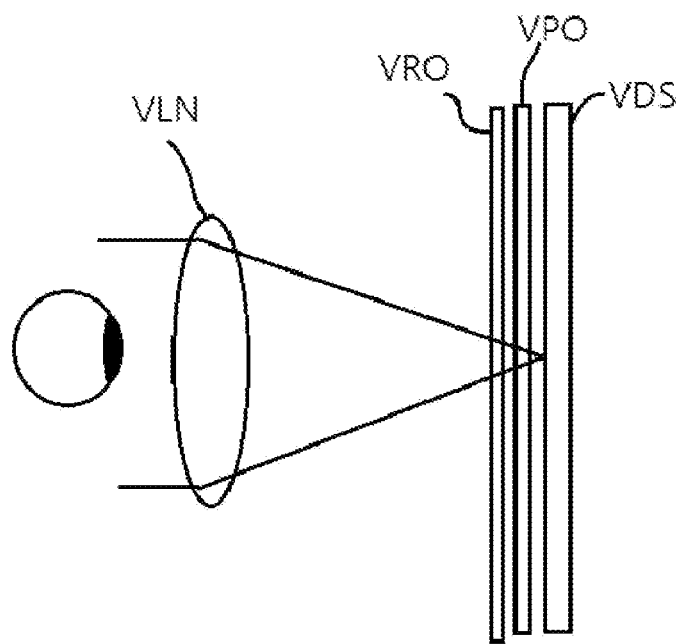
FIG. 8 shows a virtual reality head-mounted display including a varifocal lens.

In order to achieve this objective, the present embodiment provides a device as shown in FIG. 8 wherein the convex lens of the conventional head-mounted display for virtual reality is replaced by an anisotropic lens (VLN)(or an anisotropic convex lens is added to the conventional lens), the polarization film (VPO) and the unit (VRO) of rotation of the polarization axis are added in front of the display (VDS) like in an OLED and the polarization film (VPO) transmits a specific polarization to the eye and the unit (VRO) of rotation of the polarization axis rotates the polarization axis of the passing light.

The polarization fill is preferably a reflective polarization film in order to minimize the loss of light.

If a voltage applied to the unit (VRO) of rotation of the polarization axis is changed, then the polarization axis of the light passing through the unit (VRO) of rotation of the polarization axis rotates and polarized light converges while passing through the anisotropic convex lens (VLN) and the converging light reaches the eye, wherein the amount of convergence is proportional to the rotation of the polarization axis.

The voltage applied to the unit (VRO) of rotation of the polarization axis may be constant over the entire region of the unit (VRO) of rotation of the polarization axis or may be different for each micro regions covering the entire region of the unit (VRO) of rotation of the polarization axis (for example, a micro region may correspond to a pixel of the display).

For example, if a far object and a near object are displayed at the same time, then by applying a different voltage to two regions of the far and near objects, the light emitted from the two regions can converge differently at the lens (VLN) and distances between the eye and the formed images of the two objects can be different, wherein the two regions are regions of the unit of rotation of the polarization axis overlapping the objects.

If the transparent OLED is used as a display (VDS) and no image is displayed, then light from the outside can reach the eye.

However, there is a problem in that the light from the outside converges via the anisotropic convex lens (VLN) and an image of the outside is not focused on the retina.

Figure 9:
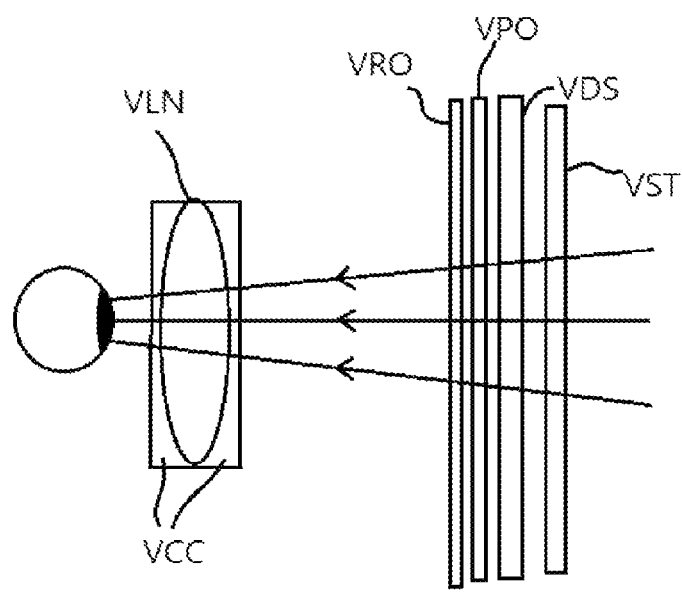
FIG. 9 is a modified configuration including an index-matching concave lens added to the configuration of FIG. 8.

In order to see an outside object clearly, it is recommended to add a concave lens (VCC) of an index matching material to the front, rear, or both sides of the anisotropic convex lens (VLN) as shown in FIG. 3 and FIG. 9.

The index matching material has the same refractive index as one of the two refractive indexes of the anisotropic convex lens and the two refractive indexes are a refractive index for the first polarization and a refractive index for the second polarization.

If light passes through the anisotropic convex lens (VLN) on which the concave lens of the index matching material is attached, then the first polarization of light converges and is refracted but the second polarization of light passes therethrough without refraction like passing through a transparent glass plate.

If the image is outputted to the display then, the eye can see the image on the display according to application of a first electric signal to the unit (VRO) of rotation of the polarization axis to rotate the polarization axis so that the first polarization light reaches the eye.

Also, if a second electric signal is applied to the unit (VRO) of rotation of the polarization axis to rotate the polarization axis so that the second polarization light reaches the eye, then eye can see the image of the outside objects.

In this manner, by repeating at high speed two states, a first state in which an image is displayed and a second state in which no image is displayed, the eye can see the overlapped image of the outside object and the displayed image.

In order to see the image of the display clearly, it is recommended to add the shutter unit (VST) (for example, the liquid crystal shutter) at the outside of the display and also it is recommended to prevent the outside light from reaching the eye by closing the shutter.

The invention claimed is:

1. A glasses-type display comprising:
a semi-transparent display arranged in front of the eyes and emitting light only in a viewing direction;
a first polarization filter transmitting, in a viewing direction, only first polarization of the light emitted from the semi-transparent display;
a first unit of rotation of polarization axis rotating the polarization axis of the light of the first polarization passing through the first polarization filter;
an anisotropic convex lens converging and refracting polarized light whose polarization axis is rotated by the first unit of rotation of the polarization axis, to a refractive index corresponding to an amount of rotation of the polarization axis; and
a reflecting unit reflecting light that passed through the anisotropic convex lens again in a direction towards the anisotropic convex lens,
wherein each pixel of the semi-transparent display emits one color of three primary colors,
wherein an eye side of the semi-transparent display includes dichroic reflective coating or color absorption coating, or wherein the eye side of the semi-transparent display includes a shutter unit for transmitting or blocking the light with respect to each pixel or for a plurality of neighboring pixels,
wherein the dichroic reflective coating reflects the one color of three primary colors emitted from the semi-transparent display in a direction toward the reflecting unit, and
wherein the color absorption coating absorbs the one color of the three primary colors.

2. The glasses-type display according to claim 1, wherein the glasses-type display comprises a shutter unit at an eye side of each pixel of the semi-transparent display for each pixel or for neighboring pixels, wherein the shutter unit transmits or blocks the light.

3. The glasses-type display according to claim 2, wherein the shutter unit is a liquid crystal shutter or a MEMS shutter.

4. The glasses-type display according to claim 1, wherein the reflecting unit of the display is a concave half-mirror or a flat half-mirror in a direction towards the eye.

5. The glasses-type display according to claim 4, wherein the glasses-type display comprises a concave lens in a viewing direction of the concave half-mirror or flat half-mirror.

6. The glasses-type display according to claim 5, wherein the glasses-type display comprises a second polarization filter and a second unit of rotation of the polarization axis in a viewing direction of the concave lens,
wherein the second polarization filter transmits, towards the eyes, only one of first polarization light and second polarization light and the second unit of rotation of polarization axis rotates the polarization axis of the polarization light passing through the second polarization filter.

7. A glasses-type display comprising:
a semi-transparent display arranged in front of the eyes and emitting light only in a viewing direction; and
an optical module reflecting, towards the eyes, the light emitted in the viewing direction;
wherein each pixel of the semi-transparent display emits one color of three primary colors,
and an eye side of the pixel includes dichroic reflective coating or color absorption coating;
wherein the dichroic reflective coating reflects the one color of the three primary colors in a direction towards the optical module, wherein the three primary colors are emitted from the semi-transparent display,
and the color absorption coating absorbs one color of the three primary colors emitted from the semi-transparent display.

8. The glasses-type display according to claim 7, wherein the optical module comprises
a half-mirror,
a convex lens at an eye side of the half-mirror,
and a concave lens in a viewing direction of the half-mirror.

9. A glasses-type display comprising:
a semi-transparent display arranged in front of the eyes and emitting light only in a viewing direction; and
an optical module reflecting, toward the eyes, the light emitted in a viewing direction from the semi-transparent display;
wherein the glasses-type display comprises a shutter unit at an eye side of each pixel of the semi-transparent display, for each pixel or for a plurality of neighboring pixels, wherein the shutter unit transmits or blocks the light,
wherein a plurality of pixels of the semi-transparent display are classified into at least two groups, and
wherein, when the light is emitted from one group of the at least two groups, the shutter unit corresponding to the one group is selectively closed.

10. The glasses-type display according to claim 9, wherein the optical module comprises
a half-mirror,
a convex lens at an eye side of the half-mirror, and
a concave lens in a viewing direction of the half-mirror.

11. The glasses-type display according to claim 9, wherein the shutter unit is a liquid crystal shutter or a MEMS shutter.

* * * * *